April 14, 1964   D. KARO   3,129,383
VOLTAGE STABILIZING ELECTRICAL TRANSFORMERS
Filed Nov. 3, 1960   9 Sheets-Sheet 1

INVENTOR:
David Karo

BY
Richardson, David and Verdon
ATTORNEYS.

April 14, 1964 D. KARO 3,129,383
VOLTAGE STABILIZING ELECTRICAL TRANSFORMERS
Filed Nov. 3, 1960 9 Sheets-Sheet 5

INVENTOR:
David Karo

BY
Richardson, David and Nordon
ATTORNEYS.

April 14, 1964     D. KARO     3,129,383
VOLTAGE STABILIZING ELECTRICAL TRANSFORMERS
Filed Nov. 3, 1960     9 Sheets-Sheet 6
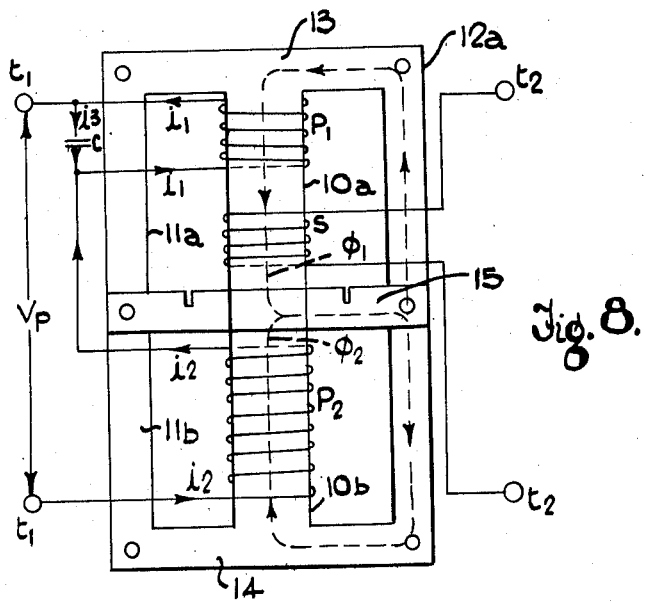
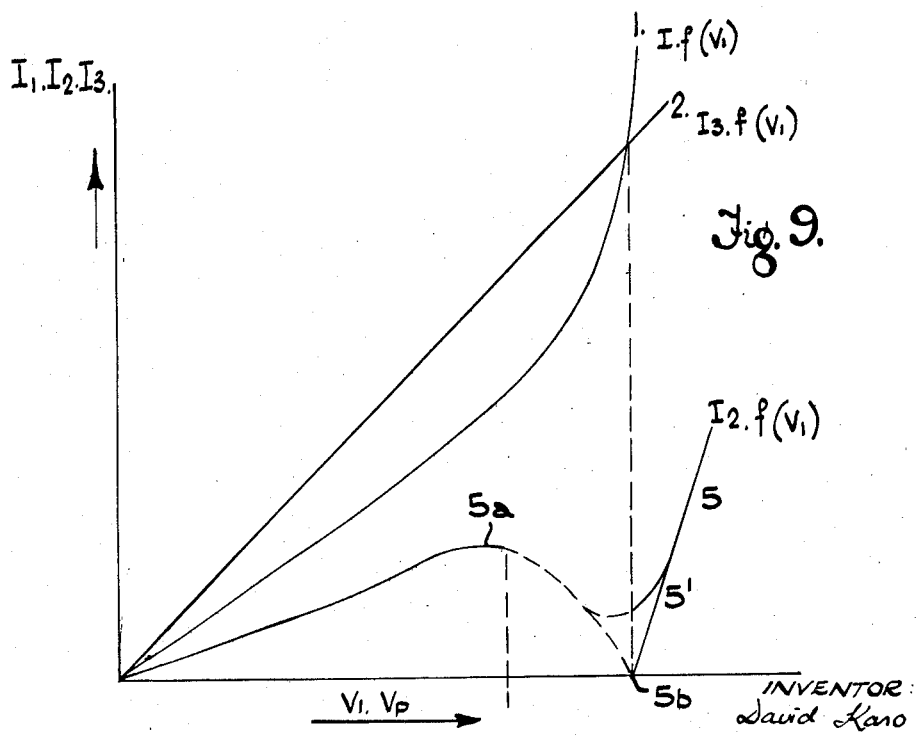

INVENTOR:
David Karo
BY
Richardson, David and Newton
ATTORNEYS.

April 14, 1964 D. KARO 3,129,383
VOLTAGE STABILIZING ELECTRICAL TRANSFORMERS
Filed Nov. 3, 1960 9 Sheets-Sheet 8

INVENTOR:
David Karo
BY
Richardson, David and Nudon
ATTORNEYS.

April 14, 1964 D. KARO 3,129,383
VOLTAGE STABILIZING ELECTRICAL TRANSFORMERS
Filed Nov. 3, 1960 9 Sheets-Sheet 9

INVENTOR:
David Karo

BY
Richardson, David and Nordon
ATTORNEYS.

United States Patent Office 3,129,383
Patented Apr. 14, 1964

3,129,383
VOLTAGE STABILIZING ELECTRICAL
TRANSFORMERS
David Karo, 53 Sandy Road, Norton,
near Stourbridge, England
Filed Nov. 3, 1960, Ser. No. 67,036
Claims priority, application Great Britain Nov. 14, 1959
13 Claims. (Cl. 323—48)

This invention relates to electrical voltage stabilizing transformers of the kind wherein stabilization is effected partly by magnetic saturation in a portion of the core structure and partly by subdividing the primary winding into portions which, considered individually induce antiphase voltages in the secondary winding of the transformer.

The object of the present invention is to provide an improved voltage stabilizing transformer of the kind specified the advantages whereof will be pointed out in or will be apparent from the following description.

According to the invention an electrical voltage stabilizing transformer comprises a core structure of magnetically conductive material including a main branch joined at its ends by a connecting branch, and including a shunt branch extending from the main branch at a position in between its ends to the connecting branch to form three magnetic circuits of which two have the shunt branch in common, the first of these two latter magnetic circuits carrying a first portion of a primary winding and a secondary winding both on the main branch at one side of the shunt branch with at least part of the secondary winding nearer to the shunt branch than is the first portion of the primary winding, and the second of these magnetic circuits carrying a second portion of the primary winding on the main branch at the opposite side of the shunt branch, the first and second portions of the primary winding being connected electrically in a primary circuit to assist each other magnetomotively in setting up a magnetic flux through the shunt branch and thereby establishing magnetic saturation in the first magnetic circuit to stabilize to some extent the magnitude of the flux interlinking the secondary winding and hence the voltage induced therein, while also acting in magnetomotive opposition in the third magnetic circuit comprising the main branch and connecting branch to provide further stabilization of the secondary voltage or reduce distortion of the secondary voltage wave form or both.

The expression "magnetic saturation" is to be deemed to mean that the flux density in at least some part of the magnetic circuit concerned is such that the working point on the curve relating the magnetizing field to the magnetic flux density produced is at or above the "knee-point," that is to say above the normal linear or substantially linear lower portion of this curve. It will be understood that above the "knee-point" increase in magnetizing field does still produce some increase in magnetic flux but the rate of increase for a given increase in magnetizing field is smaller than that obtaining below the "knee-point."

In a preferred arrangement the relative cross-sectional dimensions of the shunt branch, the main branch, and the connecting branch are such that the third magnetic circuit is unsaturated or is less saturated than the shunt branch. It will be understood that these conditions apply when the transformer is subjected to an input of primary voltage within its normal working range.

Preferably also the cross-sectional dimensions of the shunt branch are such that saturation in the first magnetic circuit tends to arise initially in the shunt branch.

Preferably also one of the portions of the primary winding has a capacitor connected in parallel therewith of a value such that the primary circuit or part thereof forms a circuit operating beyond the point of resonance to assist in attaining magnetic saturation in the first magnetic circuit.

When operating beyond the point of resonance the current flow in the first portion of the primary winding is sufficient to reduce the inductive reactance presented by this portion of the primary winding to a value less than the capacitive reactance presented either by the capacitor (if this is connected in parallel with the first portion of the primary winding), or presented by the parallel combination of the second portion of the primary winding and capacitor (when the latter is connected in parallel with the second portion of the primary winding).

In the latter case the resultant impedance presented by the primary winding as a whole is capacitive, whereas in the former case this impedance is inductive.

A further feature is that an auxiliary winding may be connected in series with the capacitor and disposed on the main branch, the inductive reactance afforded by such auxiliary winding being less than the capacitive reactance afforded by the capacitor so that the resultant reactance of this series combination is still capacitive.

The effect thus produced is that this series combination simulates a capacitor of larger value and thereby enables reduction in cost to be achieved, and can be arranged to improve stability of secondary voltage with respect to variations in the frequency of the primary or input voltage.

Whether the capacitor is connected in parallel with the first portion of the primary winding or in parallel with the second portion of the primary winding, the auxiliary winding connected in series with the capacitor is preferably interlinked with the second magnetic circuit and arranged so that the voltage across the capacitor is thereby increased over the operative stabilizing range of the transformer.

A further optional feature of the invention is that a phase-shifting winding may be interlinked with the first or the second magnetic circuit or both of these circuits and connected to a variable or constant impedance. This arrangement enables the magnetomotive forces produced by the first and second portions of the primary winding to be brought into phase opposition or such other antiphase relation as may be desired in any particular case to achieve an optimum wave form in the secondary winding.

Still another optional feature of the invention is that an auxiliary secondary winding inter-linked with the second magnetic circuit may be connected in phase or in phase opposition with the secondary winding. By "in-phase" is meant an angle between the voltages induced in the secondary winding and the auxiliary secondary winding of less than 90 degrees, and by "phase opposition" is meant an angle between these voltages of more than 90 degrees.

The invention will now be described by way of example with reference to the accompanying drawings wherein.

Figure 3:
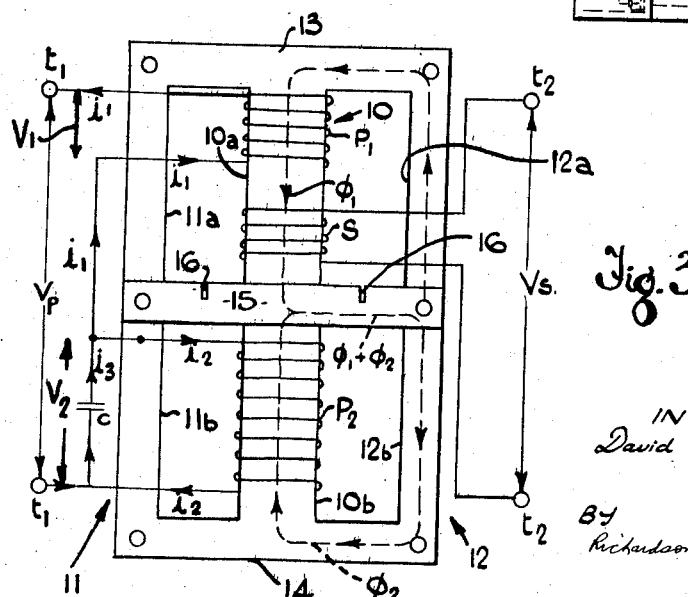
FIGURE 3 is a diagrammatic view of the construction shown in FIGURES 1 and 2 showing especially the core structure arrangement of winding thereon and simplified flux paths.
Figure 4:
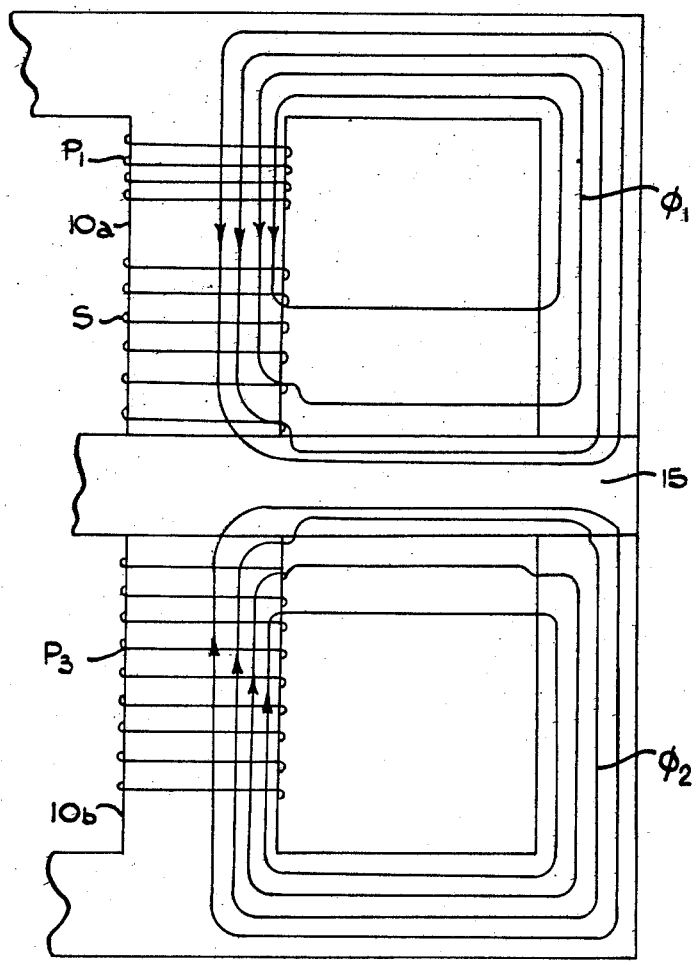
Figure 5:
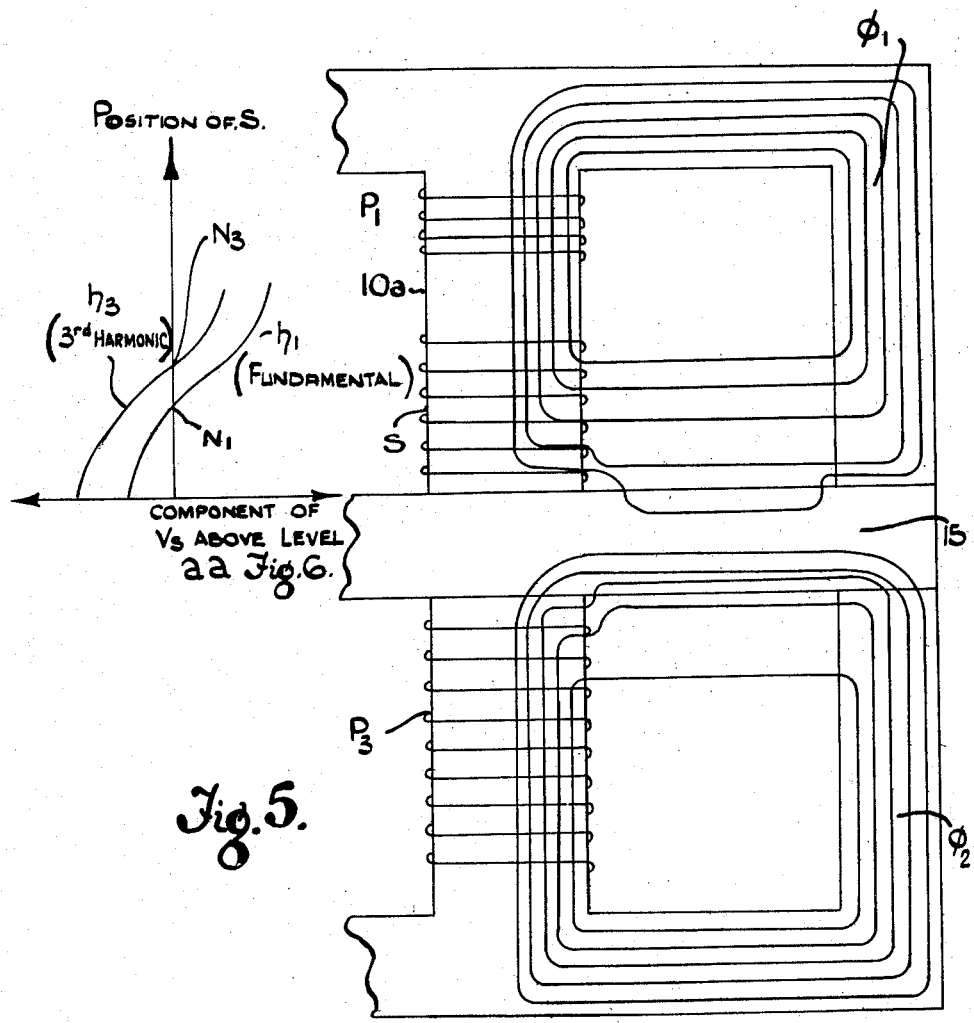

FIGURES 4 and 5 each shows a fragmentary portion of the parts shown in FIGURE 3 and illustrate in a diagrammatic form changes in the flux distribution which occur as between the application of the lower portion of the primary voltage and the upper portions of peaks thereof and illustrate also the manner in which the control of wave form of the secondary voltage is achieved.

Figure 6:
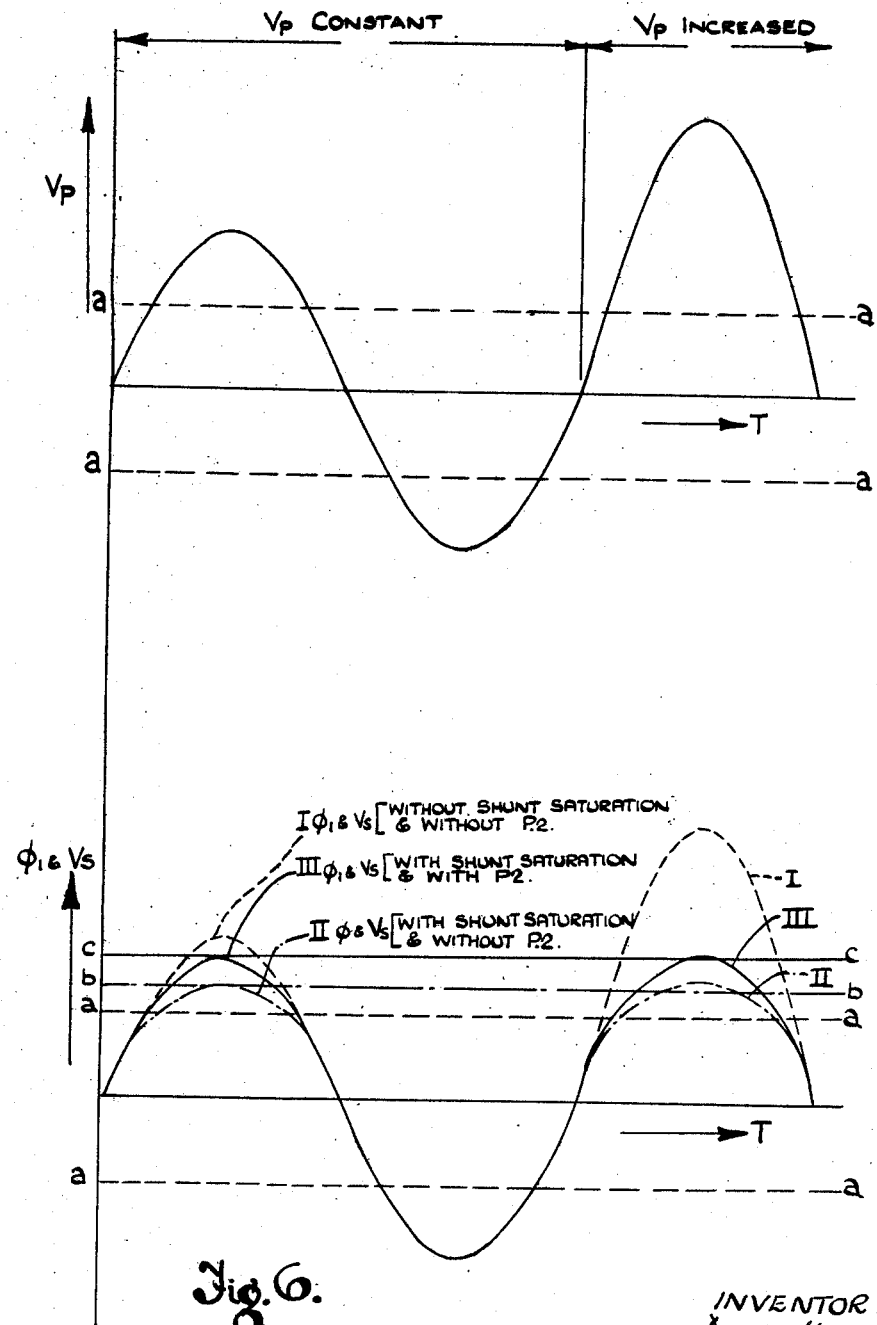

FIGURE 6 shows wave forms of primary voltage, flux in the first magnetic circuit, and secondary voltage.

Figure 7:
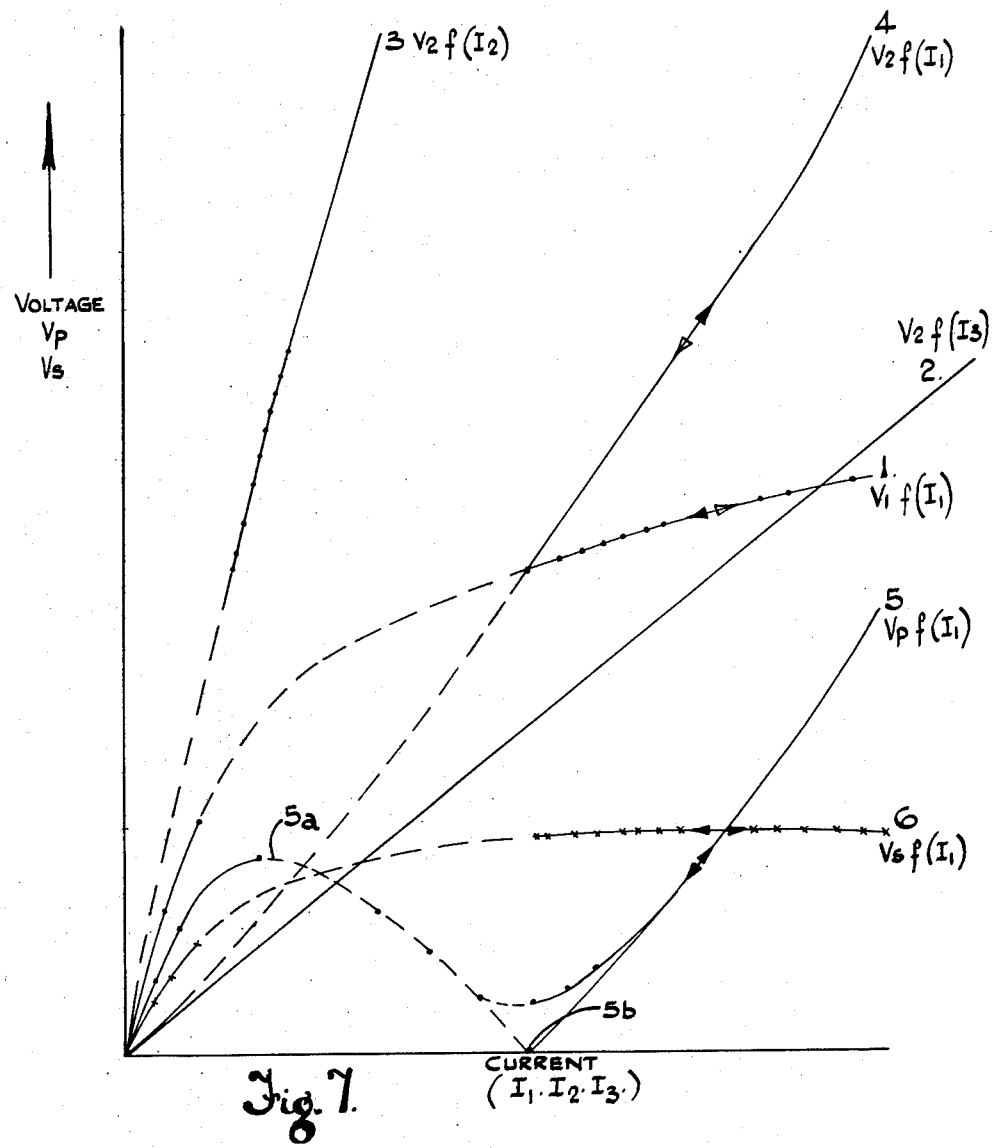

FIGURE 7 is a graph illustrating the relationships between the currents and voltages in the various windings of the transformer as the primary voltage is increased from zero to a value in the voltage stabilizing range of the transformer and shows in particular the establishment of a "beyond resonance" condition in the primary circuit of the transformer when the latter is operating on its voltage stabilizing range.

FIGURE 8 is view similar to FIGURE 3 showing an alternative embodiment of the transformer.

FIGURE 9 is a view similar to FIGURE 7 illustrating the current and voltage relationships and the establishment of a "beyond resonance" condition applicable to the embodiment of FIGURE 7.

Figure 10:
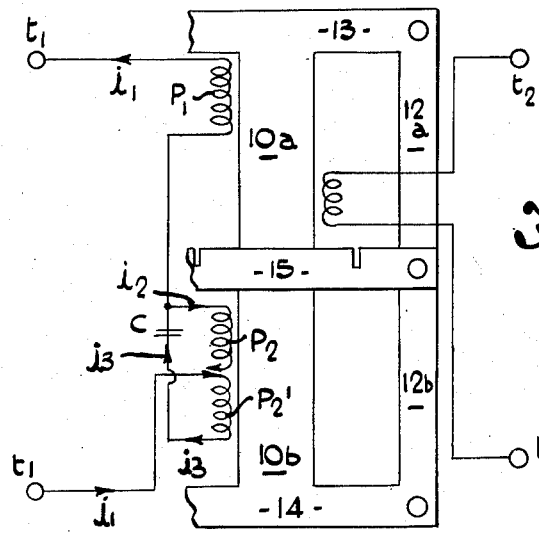

FIGURE 10 is a fragmentary diagrammatic view illustrating the provision of an auxiliary winding in series with the capacitor and applied to the form of transformer shown in FIGURES 1 to 7.

Figure 11:
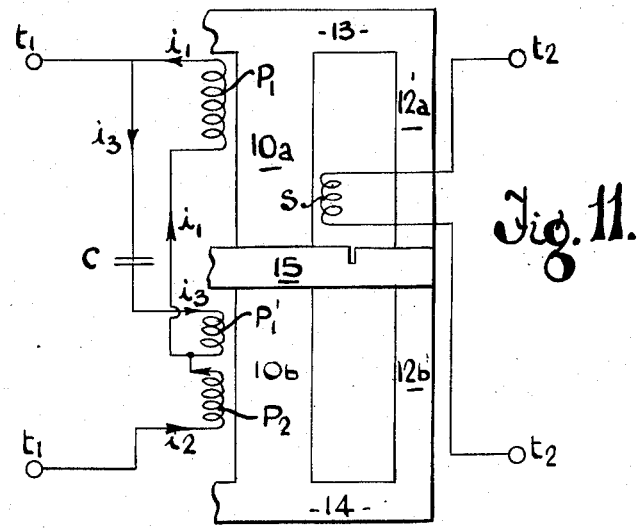

FIGURE 11 is a view similar to FIGURE 10 illustrating the modification for a transformer shown in FIGURE 8.

Figure 12:
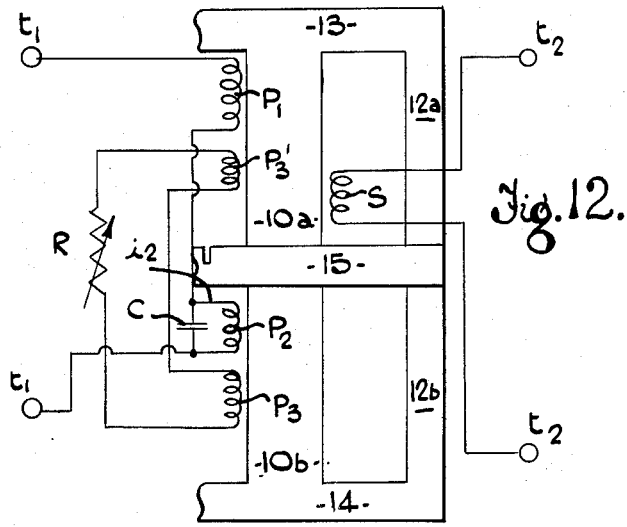
Figure 13:
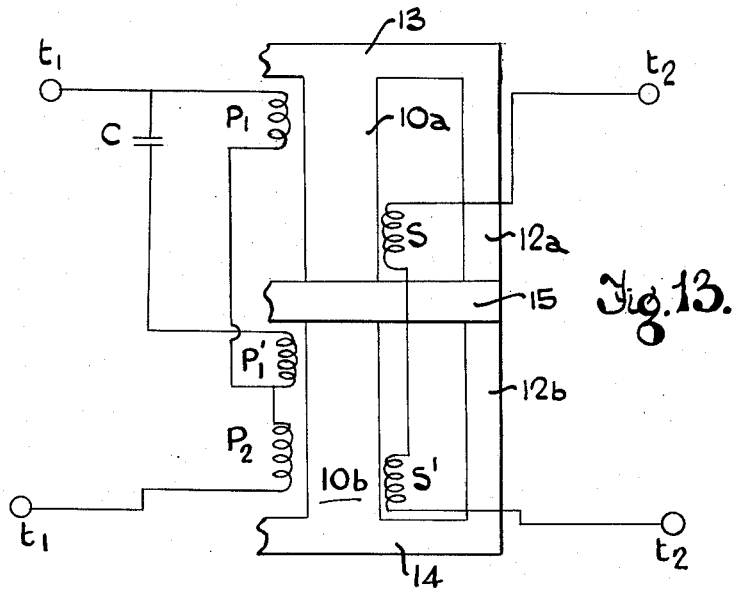

FIGURE 12 is a view similar to FIGURE 10 illustrating the provision of a phase shifting winding and FIGURE 13 is a view similar to FIGURE 10 illustrating the provision of an auxiliary secondary winding interlinked with the second magnetic circuit.

Figure 14:
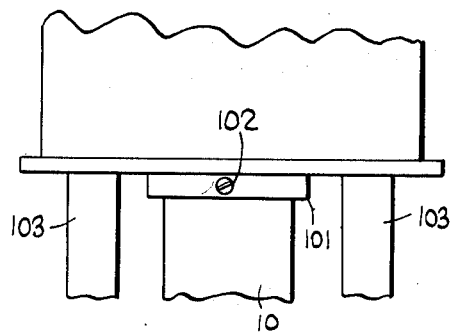
Figure 15:
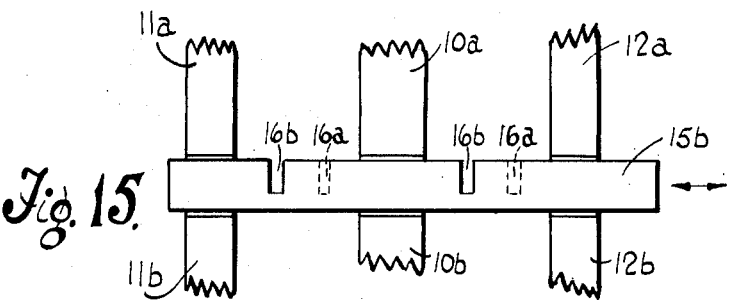
Figure 16:
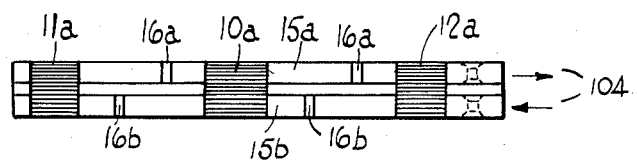
Figure 17:
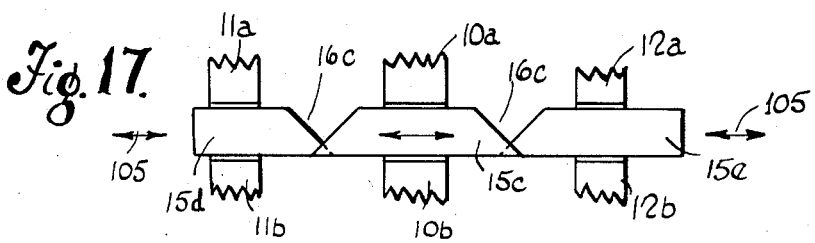

FIGURE 14 is a fragmentary view illustrating the means for securing an adjustably mounted winding of the transformer, and FIGURES 15 to 17 illustrate arrangements for varying the depth and position of slots or local reductions of area of the shunt branch.

Referring firstly to the transformer illustrated in FIGURES 1 to 7, this comprises a core structure having a main branch in the form of a central limb 10, the ends of which are joined by connecting branches comprising side limbs 11 and 12 all parallel to each other, and end limbs 13 and 14.

At a position in between the ends of the limb 10 it is connected to the side limbs 11 and 12 by shunt branch 15.

This core structure affords a first magnetic circuit which is identified as comprising the upper portions 10a, 11a and 12a of the correspondingly numbered limbs, the end limb 13 and the shunt branch 15.

The core structure further affords a second magnetic circuit which is identified as comprising the lower portions 10b, 11b and 12b of the correspondingly numbered limbs, the end limb 14 and again the shunt branch 15 which is thus common to both the first and second circuits.

The core structure further affords a third magnetic circuit which is identified as comprising the whole of each of the limbs 10, 11 and 12, together with the end limbs 13 and 14, the shunt branch 15 except the parts thereof which are inserted in the limbs 10, 11 and 12 being excluded from this circuit.

The core structure may be built up of laminations of any convenient configuration.

Thus the portions 10a, 11a, 12a and the end limb 13 may be formed unitarily or of separate laminations. By way of example, E-shaped laminations are shown, as is also the case for the portions 10b, 11b, 12b and the end limb 14, while the shunt branch is formed of strip-like laminations.

Where the shunt branch 15 is joined by the E-shaped laminations, the joints may be of the butt-joint type.

If desired, gaps of predetermined suitable thickness may be left at any of these junctions to control the relative reluctances of the several magnetic circuits previously referred to. Shims of brass or other non-magnetic material may be clamped in these gaps.

Alternatively, if desired, the joints may be of the interleaved type.

The magnetic reluctance afforded by the shunt branch and the minimum cross-sectional area afforded thereby at a position along its length is controlled by the provision of slots 16. It will however, be understood that, if desired, the cross-sectional dimensions of the shunt branch along its whole length could be made equal, or approximately equal, to those afforded at the base of each of these slots.

Figure 1:
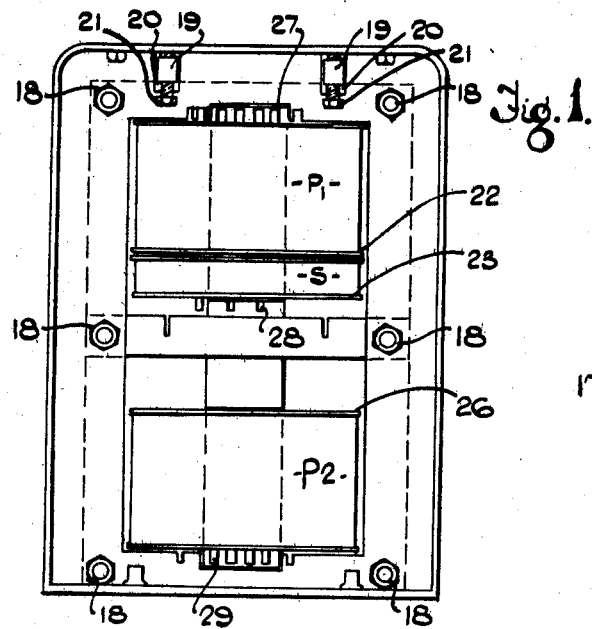
FIGURE 1 is a simplified view in front elevation showing one embodiment of a transformer in accordance with the invention, the outer case being omitted.
Figure 2:
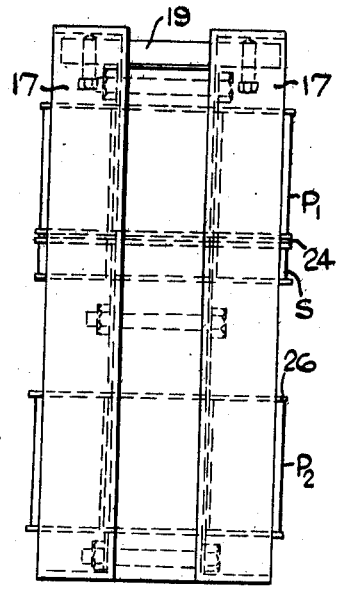
FIGURE 2 is a view of the construction shown in FIGURE 1 in side elevation.

FIGURES 1 and 2 illustrate a supporting structure associated with the core structure and comprising a pair of frames 17 conveniently, fabricated from angular section stock and connected by clamping bolts 18 extending either through apertures in the core structure (which are omitted from FIGURE 3 for the sake of simplicity), or outside the core structure.

At the upper end of the supporting structure, as seen in FIGURE 1, pressure bars 19 extend through slots 20 in the inner, parallel flanges of the two clamping frames 17, and carry bolts 21 extending through screw threaded holes in the pressure bars to engage the outer peripheral flanges of their associated frames while the pressure bars themselves bear on the assembly of E-shaped laminations which form the limb portions 10a, 11a and 12a, and the limb 13 to secure these in tightly abutting relation with the shunt branch 15 either directly or through the intermediary of shims inserted between the two at the junctions of the shunt branch 15, with these limbs.

Wound on the upper portion of the main branch, i.e., on the portion 10a, is a first portion $P_1$ of a primary winding. A second portion $P_2$ of the primary winding is wound on the lower limb portion 10b of the main branch. A secondary winding S is wound on the limb portion 10a and is disposed between the winding $P_1$ and the shunt branch 15, or possibly in partly overlapping relation with winding $P_1$ but having a part which is nearer to the shunt branch than is the winding $P_1$.

As will be evident from FIGURES 1 and 2, these windings are carried by bobbins or formers. A bobbin indicated generally at 22 having axial flanges is provided to accommodate the winding $P_1$ and a bobbin 23 having axial flanges to accommodate the winding S. An axially flanged bobbin indicated generally at 26 is provided to accommodate the winding $P_2$.

The leads to the various windings may emerge through the flanges of these bobbins as indicated at 27, 28 and 29.

As will be evident from FIGURE 3 the windings $P_1$ and $P_2$ are connected in series with each other, and terminals $t_1$ between which the input or primary voltage $V_p$ is applied, the latter being derived from the supply means or other imperfectly stabilized source of alternating voltage. Typically, in the case of a supply means this fluctuation may amount to as much as 18% of the nominal value.

The secondary winding S is connected to terminals $t_2$ between which appears the output or secondary voltage $V_s$.

The winding $P_2$ has connected in parallel thereto a capacitor C. This may be a component which is structurally separate from the main body of the transformer itself or alternatively it may be mounted on or assembled with the main body, and permanently connected in the primary circuit as may be desired in any particular case.

Referring now to the manner of operation of the transformer, a simplified representation of the magnetic fluxes set up in the first magnetic circuit, together with the currents producing same, is shown in FIGURE 3. The currents $i_1$, $i_2$, and $i_3$ represent instantaneous values of corresponding currents $I_1$, $I_2$, $I_3$ and instantaneous magnetic fluxes are represented by the broken lines $\phi_1$, $\phi_2$, the directions of these fluxes instantaneously being indicated by the arrows.

On a simple analysis of the manner of operation it is firstly assumed (as will be hereinafter explained in greater detail), that the instantaneous currents $i_1$, $i_2$, are in anti-phase to each other.

These currents flowing through the windings $P_1$ and $P_2$ set up magnetomotive forces, giving rise to the fluxes $\phi_1$ and $\phi_2$. It will be evident that the directions of the magnetomotive forces due to the windings $P_1$ and $P_2$ are such that they assist each other in establishing the flux $\phi_1 + \phi_2$ through the shunt branch 15.

Considering a single half cycle of applied voltage $V_p$, it will thus be evident that as this voltage rises from zero to a predetermined point on the wave form, the fluxes $\phi_1$ and $\phi_2$ will increase and when this predetermined point is reached, the magnitude of the combined flux $\phi_1 + \phi_2$ extending through a shunt branch 15, will produce magnetic saturation therein (which will occur in the first instance at the base of each slot 16). Consequently, during this stage of operation, a voltage is induced in the secondary winding S due to the increasing flux $\phi_1$.

As the primary voltage $V_p$ rises above said predetermined point, further increase in the flux $\phi_1$ is resisted by the saturation occurring in the shunt branch 15, and there is thus a tendency for the voltage induced in the secondary winding S to achieve some measure of stabilization. The wave form of the flux $\phi_1$ will be somewhat flattened due to the tendency of the current $I_1$ to peakiness producing a significant ohmic voltage drop in $P_1$. The secondary voltage thus induced will be thus also distorted as compared with that of the voltage $V_p$ (assumed to be a sine wave) due to this magnetic saturation in the shunt branch.

After saturation has taken place in the shunt branch, however, that is for that part of the working cycle of the primary voltage wave form above said predetermined point or level, the transformer can be regarded as consisting wholly or predominantly of the third magnetic circuit, namely the whole of the main branch 10 together with the limbs 11, 12, 13 and 14. In this third magnetic circuit the magnetomotive forces of the windings $P_1$ and $P_2$ are in opposition, and the simple effect is one which can be regarded as that due to resultant or net magnetomotive force. This can either be in the same direction as that due to $P_1$ (but in this case being of a magnitude such as would be produced by a reduced number of ampere-turns in $P_1$), or if $P_2$ predominates, can be regarded as being in the same direction as that due to $P_2$ (but in this case being of magnitude such as would be produced by a reduced number of ampere-turns in $P_2$).

This effect can therefore be used ($P_1$ predominating), if desired, to set up a flux component in the first magnetic circuit which will partially restore the distorted flattened wave form of the flux $\phi_1$, to sinusoidal or approximately sinusoidal shape, without impairing or while only slightly impairing that degree of voltage stabilization already obtained by the saturation effect in the shunt branch 15, when used in this way.

Alternatively, this effect can be used to improve the stabilization by arranging the magnetomotive force of $P_2$ to predominate over that of $P_1$ after initial stabilization has been achieved through saturation in the shunt branch, without treating waveform correction as a primary consideration (although in this case selected harmonics can still be eliminated or reduced as hereinafter explained upon a more complex analysis of the manner of operation).

A more detailed explanation of these effects is now given with reference to FIGURES 4, 5 and 6. In FIGURE 4 the flux $\phi_1$ present in the first magnetic circuit and the flux $\phi_2$ present in the second magnetic circuit are each represented by four lines of flux and represent the flux conditions which pertain to that part of the primary voltage wave form within the zone bounded by the two lines $a—a$ (FIGURE 6) drawn as abscissae at equal distances above and below the time axis represented at T. The lines $a—a$ are arbitrarily selected in FIGURE 6 as representing the magnitude of the instantaneous primary voltage which will just produce saturation in the shunt branch 15.

It will be observed that all the four flux lines representing the flux $\phi_1$ in FIGURE 4 are shown as interlinked with the winding $P_1$ but only the two outer ones are interlinked with all the turns of the secondary winding S, the two inner flux lines extending through a leakage path above the shunt branch and interlinking only some of the turns of the secondary winding S, neglecting minor effects.

FIGURE 5 represents the flux conditions which pertain to a particular point on the primary voltage wave form outside the zone bounded by the lines $a—a$.

At this point the primary voltage will be of a greater magnitude and in each case the flux $\phi_1$ and $\phi_2$ will have increased and is consequently represented in FIGURE 5 in the case of the flux $\phi_1$ by five flux lines and similarly in the case of the flux $\phi_2$ by five flux lines.

Both of the magnetomotive forces due to the windings $P_1$ and $P_2$ respectively will have increased under the conditions represented in FIGURE 5, and consequently there is a higher degree of saturation in the shunt branch 15. The extent to which the shunt branch 15 carries flux $\phi_1$ due to the winding $P_1$ and flux $\phi_2$ due to the winding $P_2$ will depend upon the relative values of the magnetomotive forces produced by these windings, and in the typical case illustrated the effect produced is that the flux $\phi_2$ is tending to crowd the flux $\phi_1$ out of the shunt branch and cause more and more of the flux to extend along leakage paths generally parallel to the shunt branch.

In consequence of this, and as typically illustrated in FIGURE 5, none of the lines of magnetic flux now link the secondary winding S completely.

It will thus be evident that by suitably proportioning the magnetomotive forces produced by the windings $P_1$ and $P_2$, a condition can be achieved wherein the increase in magnitude of the flux $\phi_1$ for voltage values outside the zone bounded by the lines $a—a$ of FIGURE 6 is offset by the fact that the increased flux $\phi_1$ has a reduced interlinkage with the winding S so that the secondary voltage induced therein will not be further increased even if the value of the primary voltage rises considerably.

This is illustrated in FIGURE 6 wherein the first complete cycle of primary voltage is shown as having a constant magnitude, and the half cycle to the right shows a substantially increased magnitude. Any transient effects accompanying an increase in $V_p$ are omitted.

The wave form of the primary voltage is assumed to be a sine wave.

If the lower portion of the transformer, i.e., below the shunt branch 15 and including the winding $P_2$ were completely removed and the shunt branch were of dimensions such that no saturation occurred, the flux $\phi_1$ and the voltage $V_s$ induced in the secondary winding S would be as represented by the dashed line outside the zone bounded by the lines $a—a$ and indicated as curve I.

It will be understood that the secondary voltage $V_s$ will not be in phase with the flux $\phi_1$ and will have a waveform which differs somewhat whenever the flux waveform is not truly sinusoidal, but for convenience in illustration these quantities have been represented by the same curve.

The secondary voltage would be of undistorted wave form, i.e., a sine wave, and its magnitude would be related to the magnitude of the primary voltage $V_p$ by a constant factor, that is the transformation ratio which in this case would be a constant, neglecting minor effects.

If now the shunt branch utilised were of dimensions such as to produce saturation, but the winding $P_2$ were omitted, the flux $\phi_1$ and the secondary voltage $V_s$ would be as represented by the chain line (curve II) outside the zone bounded by the lines $a—a$. This curve would be distorted compared with the sine wave of primary voltage $V_p$ and would tend to be somewhat flattened at its top the limit of which in the first full cycle is represented by the line b—b.

It is well known that when saturation occurs, in a magnetic circuit of a transformer to the primary winding of which a sine wave of voltage is applied, the primary current increases sharply and becomes peaky, and over this part of the cycle, the ohmic voltage drop in the primary winding is greater relatively to the inductive voltage drop than that which occurs in the lower part of the cycle, so that the wave form of flux, instead of being a pure sine wave (as would be the case were the primary winding to have no resistance and irrespective of whether saturation occurred or not), becomes of flattened form as illustrated in curve II.

This effect does produce some degree of voltage stabilization inasmuch as an increase in primary voltage, as seen in the third half cycle of the wave form, produces a smaller rise in flux $\phi_1$ and secondary voltage $V_s$ above the line b—b than was the case for curve I. However, not only is stabilization less than that desired, but is accompanied by an increasing distortion of the wave form since the line a—a will intersect the third half cycle of $\phi_1$ and $V_s$ earlier on the rising side of the half cycle and later on the falling side, so that the proportion of the wave form which is flattened is rather greater than occuring in the first complete cycle when the primary voltage was of lower value.

By addition of the lower part of the magnetic circuit, i.e., that part below the shunt branch 15, and the addition of the opposing winding $P_2$, wave form correction of the curve II is achieved as shown in curve III. The transformer operates outside the zone bounded by the lines a—a more nearly as an unsaturated transformer, due to the existence of the relatively unsaturated third magnetic circuit, and the magnitude to which the voltage rises as indicated by the line c—c is determined by the relative values of magnetomotive force produced by the windings $P_1$ and $P_2$.

As previously mentioned it would be possible to so proportion the windings $P_1$ and $P_2$ as to the number of turns incorporated in each, that complete stabilization is attained. This is however, possible only at a given frequency and it will be evident that by virtue of the saturation which occurs in the shunt branch and hence in the first magnetic circuit, current $I_1$ passes through the winding $P_1$ and must be of a peaky character and therefore contain a number of harmonics of a higher order than the fundamental frequency. These harmonics do not divide between the winding $P_2$ and the capacitor C in the same proportion as the fundamental frequency currents since the capacitor C offers a lower impedance with increase in the order, i.e., the frequency of each harmonic.

It is therefore possible to arrive at a condition suitably by proportioning of the number of turns incorporated in the windings $P_1$ and $P_2$, or by suitably selecting the position of the winding S between them, to eliminate completely a selected harmonic. The selected harmonic may be the first harmonic or fundamental if a very high degree of stabilization is required, or may be the third harmonic if good wave form is required and some departure from absolute stabilization can be tolerated.

It will be understood that in addition to the different divisions of the various harmonics of current as between the winding $P_2$ and the capacitor C, the relative effects of the windings $P_1$ and $P_2$ to induce a given harmonic in the winding S is conditioned by the fact that the effective mutual inductance between S and $P_2$ at the one hand and $P_1$ on the other hand is a function of frequency to a certain extent.

In practice both these effects are taken into account in proportioning the numbers of turns in $P_1$ and $P_2$ or in selecting the position of S to eliminate or minimise the inducing of a particular selected harmonic in the winding S.

In the diagram shown at the lefthand side of FIGURE 5, the component of the secondary voltage $V_s$ induced in the secondary winding S due to the magnetomotive opposition of the two windings $P_1$ and $P_2$ for that part of the voltage wave form lying outside the zone bounded by the lines a—a of FIGURE 6 is plotted as an abscissa against the position of the winding S as ordinate. Curve $h_1$ shows the component of the voltage $V_s$ at the first harmonic or fundamental frequency whilst the curve $h_3$ shows the component of the voltage $V_s$ at the frequency of the third harmonic. It will be understood that these curves are not intended to represent accurately the voltage induced in the winding S, but show the general effect of displacing the winding S relatively to the windings $P_1$ and $P_2$ along the axis of the main branch 10.

It will be evident that at points marked $N_1$ and $N_3$ the induced component of the voltage $V_s$ is zero and these points therefore may be regarded as representing neutral planes in which the magnetomotive forces of the windings $P_1$ and $P_2$ exactly counter-balance each other in the third magnetic circuit at the fundamental or first harmonic frequency, and at the third harmonic frequency respectively. It is possible therefore to eliminate a selected harmonic completely.

The winding S is not located in a single plane at right angles to the axis of the main branch, but includes portions distributed above and below such plane so that while the diagram is representative of the principle of operation, in practice the distribution of the two fluxes $\phi_1$ and $\phi_2$ is more nearly represented in the righthand side of FIGURE 5 by the flux lines therein shown.

The curve III of FIGURE 6 represents a typical compromise wherein wave form distortion as compared with curve II has been reduced, and some improvement in stabilization has also been attained as will be evident from the fact that in the third half cycle the curve III lies above the line c—c (representing the peak value of $\phi_1$ and $V_s$ of the first complete cycle) to an extent which is relatively less than that by which the curve II rises above the line b—b in the third half cycle.

From another standpoint, the transformer can be regarded as operating with a constant transformation ratio within the zone bounded by the line a—a of FIGURE 6, while outside this zone it operates with a different transformation ratio due to the opposing relation between the winding $P_1$ and $P_2$. This different transformation ratio is not the same for the fundamental or first harmonic as it is for the higher harmonics, e.g., the third harmonic.

Thus, if the transformation ratio at any given point on the wave form of the primary voltage $V_p$ is the increase of the secondary voltage $V_s$ with respect to the increase in the primary voltage $V_p$, that is the expression:

$$\frac{\Delta V_s}{\Delta V_p}$$

this can be arranged to have a value which is zero for points on the wave form outside the zone a—a for the fundamental or first harmonic frequency if stabilization at this frequency is the primary consideration, and zero or negative for the third or higher harmonic frequency if wave-form is the primary consideration. In practice, a compromise between these two conditions can normally be found to provide optimum results where both good stabilization and good wave form are required. It will of course be appreciated that the ratio $$\frac{\Delta V_s}{\Delta V_p}$$

will vary in value to some extent over those portions of the wave form outside the zone a—a so that again, in practice, the best compromise has to be formed by adjusting the relative predominance of either $P_1$ or $P_2$ by one of the procedures hereinafter referred to.

The means for controllably varying the relative influence of the windings $P_1$ and $P_2$ on the secondary winding S may take any suitable form.

It is contemplated that any of the windings $P_1$, $P_2$ and S may be mounted on the main branch in such a manner as to be adjustable in position along it. The formers of these windings may thus be slidably mounted on the main branch and may be adapted to be retained in any position of adjustment therealong by a retaining device such as is shown in FIGURE 14. In this case the former of the winding S, $P_1$ or $P_2$ may have a core portion which is extended as shown at 101. A threaded hole is formed through the wall of this extension 101 and receives a set screw 102 which engages frictionally with the main branch 10 or the outermost lamination of the latter may be formed with a series of longitudinally spaced indentations with which the inner end of the set screw 102 engages. Alternatively, the extension 101 may be structurally separate from the associated former and in any case where the former is not retained at its opposite end by abutment with part of the core structure or with an adjacent former a second part 101 in the form of a structurally separate collar could be provided.

As a possible alternative, packing pieces 103 (FIG. 14) may be inserted between either end of the former concerned and the adjoining part of the core structure of the transformer or an adjacent former, as the case may be. The extension or collar 101 and the packing pieces 103 are preferably made of a non-magnetic material which is also an electrical insulator.

Alternatively or in addition (and as illustrated in this embodiment shown in the drawings), the relative numbers of turns incorporated in the windings $P_1$ and $P_2$ may be varied by providing tapping points on either or both of these windings.

The arrangements shown in FIGURES 15 to 17 provide for adjustment of the depth and position of the slots 16 in the shunt branch. Adjustment in depth will have the effect of altering the height of the line a—a previously referred to and as shown in FIGURE 6, while adjustment of the slots in position will enable them to be situated either midway between the main branch and the outer branches of the core structure where they would tend to be traversed by all that part of each flux $\phi_1$ and $\phi_2$ which passes through the shunt branch, or situated away from this mid position towards either the main branch or the outer branch where they would be out of the path of the parts of the flux $\phi_1$ or $\phi_2$ which leak through air across the corners of the core structure where the shunt branch joins the main centre branch and the two outer branches.

In FIGURES 15 and 16 the shunt branch is shown as divided into two sections 15a and 15b containing respective slots 16a and 16b which can either be offset from each other lengthwise of the shunt branch or brought into registration with each other as desired by relative movement of the components 15a and 15b as indicated by arrows 104. By placing the slots 16a and 16b in register with each other, maximum constriction to the passage of flux and maximum saturation at the bases of the slots is achieved and by moving the slots 16a and 16b apart the degree of saturation is reduced.

In FIGURE 17 the shunt branch comprises a center component 15c the ends of which are cut off obliquely to its length and which is interleaved with obliquely cut off ends of outer components 15d and 15e to form V-shaped depressions 16c, the depth of which can be varied by moving the components 15d and 15e as indicated by arrows 105. The position of the depressions 16c can be varied by moving all components 15c, d, and e in the same direction.

The diagrams FIGURES 4, 5 and 6 are representative of conditions of operation in the transformer when the value of the primary voltage $V_p$ lies in the stabilizing range.

FIGURE 7 illustrates a set of curves which show transient or built up conditions after the primary voltage $V_p$ is applied to the transformer, and for the purposes of explanation it will be assumed that the voltage $V_p$ is increased gradually from zero.

In the graph shown in FIGURE 7 voltages are plotted as ordinates against currents $I_1$, $I_2$, $I_3$ (abscissae). The voltage $V_2$ developed across the winding $P_2$ and capacitor C is shown as a function of the current $I_3$, and the current $I_2$ in curves 2 and 3 respectively, the slope of the former being appreciably less than the slope of the latter, so that for a given voltage $V_2$ (any horizontal abscissae), the current $I_3$ will substantially exceed the current $I_2$. The parallel combination of the winding $P_2$ and capacitor C will therefore behave as a capacitive reactance.

The curve 4 represents the voltage $V_2$ as a function of the current $I_1$. It will be observed that the initial portion of this curve is approximately linear whilst the upper portion has an increase in slope.

The curve which represents the voltage $V_1$ across the winding $P_1$ as a function of the current $I_1$ and shows a marked saturation characteristic.

The voltages $V_1$ and $V_2$ will be in antiphase or approximately so, the intersection of curves 4 and 1 represents a resonant condition at which (neglecting all resistance) a primary voltage $V_p$ of zero value would produce currents.

In practice, the curve 5 which is the difference in ordinates between curves 4 and 1 shows the primary voltage $V_p$ as a function of the current $I_1$ does not reduce to zero as indicated by the critical point 5b but has a dip, the minimum ordinate of which is situated above the point 5b, this being due to the resistive components of the windings.

The falling part of the curve 5, as indicated between the points 5a and 5b represents an unstable characteristic, and in practice the rising of the primary voltage $V_p$ to any value above the first maximum indicated at 5a will automamtically transfer the working point to the stable portion of the curve 5 to the right hand side of the point 5b.

Stable working portions of the various curves are indicated in full lines, and unstable portions in broken lines.

It will further be understood that since working takes place to the right hand side of the dip, above the point 5b, the capacitive reactance afforded by the capacitor C and the winding $P_2$ in parallel therewith will be greater than the inductive reactance afforded by the winding $P_1$ and hence the current $I_1$ will be a capacitive current, and the primary circuit as a whole will present a capacitive reactance to the input terminals $t_1$.

Since the current $I_1$ and $I_2$ are in antiphase, the directions of the instantaneous currents $i_1$ and $i_2$ are as shown in FIGURE 3.

It will be understood that the provision of a capacitor C producing working upon a part of the curve 5 beyond resonance that is to the right hand side of the dip enables sufficient values of current $I_1$ and $I_2$ to be established under normal supply voltages in the windings $P_1$ and $P_2$, and consequently enables the desired saturated condition to be achieved in the shunt branch 15.

It is contemplated however that it would be possible for transformers designed for use on low powers and where wave form and efficiency are not important to dispense with the use of a capacitor C, the number of ampere-turns afforded by the windings $P_1$ and $P_2$ being then sufficient to saturate the shunt branch 15 and establish working in magnetomotive opposition over the upper part of the input voltage wave forms as already described. The winding $P_2$ will then have its connection reversed relative to $P_1$.

It is considered that, having regard to the foregoing explanation as to the manner of operation, and arrangement and connection of the windings, the construction of a transformer in accordance with the invention will be within the capacity of those skilled in the art. However, by way of example, the following particulars are given of a specific construction of transformer of the form shown in FIGURES 1 to 7 designed to provide a stabilized voltage and corrected wave form somewhat as shown in FIGURE 6.

Dimensions of core structure:
Main Branch 10—length (6.0"); width (1.22"); thickness (1.25").
Shunt branch 15—length (5.0"); width (0.6"); thickness (1.25").
(Dimensions of slots 16 these being positioned centrally between the main branch and the side limbs 11 and 12)=depth=0.281"±0.0156" width =0.06 to 0.04".
Side limbs—length (6.0"); width (0.6"); thickness (1.25").
End limbs 13 and 14—length (5.0"); width (0.6"); thickness (1.25").

Windings:
Winding $P_1$—tappings at 0—200—1200 turns; 21 SWG copper ware.
Winding $P_2$—tappings at 0—100—2100—2200—2500—2700 turns; 24 SWG copper ware.
Windings S—tappings at 0—40—845—925—1005 turns; 6 SWG copper ware.
(Overall dimensions and positions of windings as shown in FIGURES 1 and 2)

Capacitor: Two sections 20 mfd. each 440 volt working connected in series.

The following performance figures have been obtained for this transformer rated at 90 volt amperes.

Primary voltage $V_p$ varied from 180 volts to 260 volts.

Voltage stabilization: Secondary voltage $V_s$ constant at 246.6 volts±0.40% (on no load).

Wave form distortion: Measured as harmonic content (percent of fundamental)—
(1) On full load—less than 2.84%.
(2) On no load—less than 4.3%.

An alternative embodiment of the transformer is illustrated in FIGURE 8.

In this embodiment the arrangement of windings $P_1$, $P_2$ and S on the core structure and the construction and proportioning of the latter may be generally similar to that of the first described embodiment with the exception that the direction of the winding $P_2$ is reversed. The capacitor C is connected in parallel with the winding $P_1$.

The transient or build up conditions of operation of this transformer when the primary voltage $V_p$ is applied and is increased differ somewhat from those of the transformer described with reference to FIGURES 1 to 7, as do also operating conditions over part of the voltage stabilizing range.

These conditions are illustrated in the graph of FIGURE 9.

In this circuit the parallel combination of the winding $P_1$ and capacitor C is a circuit operating beyond the point of resonance when the transformer is operating in the voltage stabilizing range, and presents an inductive reactance. The curve 2 of FIGURE 9 represents the current $I_3$ passing through the capacitor C as a function of the voltage $V_1$ and is hence linear. This current $I_3$ is in anti-phase or approximately anti-phase relation to the current $I_1$ passing through the winding $P_1$, the latter being represented by the curve I as a function of the voltage $V_1$.

The curve II represents the current $I_2$ as a function of $V_1$ and is the vector addition of the currents $I_1$ and $I_2$ (approximately the numerical difference), as a function of $V_1$. The theoretical resonance point is indicated at 5b and the actual dip in the curve 5 disposed above this point represents the actual conditions of operation due to the effective resistance of the transformer.

Working on the curve 5 takes place to the right hand side of the dip and is achieved automatically by the raising of the voltage $V_p$ to a value greater than that corresponding to the point 5a on the curve 5.

It will be understood that at the point 5b and to the left hand side of the points as seen in FIGURE 9, the winding $P_2$ does not oppose the winding $P_1$ magnetomotively. This is because at the point 5b the current $I_2$ is of zero value, while to the left hand side of the point 5b the direction of the current $I_2$ is such that the winding $P_2$ assist the winding $P_1$ magnetomotively.

Under these conditions the flux $\phi_2$ as seen in FIGURE 8 will be reversed in direction and saturation in the shunt branch 15 will be achieved by the magnetomotive force due to the winding $P_1$ alone. When this condition is arrived at, however, the inductance presented by the winding $P_1$ will tend to decrease with rising values of the primary voltage $V_p$ so that the "beyond resonance" condition will be achieved, wherein the current $I_3$ through the capacitor C exceeds in magnitude than the current $I_1$ through the winding $P_1$ leading to a reversal of the current $I_2$ which in turn produces a change-over in the direction of magnetomotive force set up by the winding $P_2$.

Even somewhat to the right hand side of the point 5b the magnetomotive force set-up by the winding $P_2$ may be insufficient to prevent that due to the winding $P_1$, forcing flux round the third magnetic circuit in a direction opposite to that indicated by the lower arrows in FIGURE 8, but with further increase in the primary voltage working will take place further to the right of the point 5b and the magnetomotive force due to $P_2$ will then be strong enough to set up the flux $\phi_2$ in the direction indicated.

Both these conditions represent operative stabilizing ranges for the transformer in as much as the magnetomotive forces due to windings $P_1$ and $P_2$ are in opposition, even though in the first case mentioned the direction of flux $\phi_2$ in the main branch is the same as that of $\phi_1$.

In the second case, whilst the components of the flux $\phi_1$ and $\phi_2$ representing the fundamental frequency are in opposition in the main branch, the components representing higher harmonics (e.g., the third harmonic) can still be in the same direction in the main branch and therefore their difference will appear in the shunt branch. An improved wave form of flux and hence secondary voltage can be achieved having a very low percent of distortion.

Subject to these variations the manner of operation is generally similar to that already explained with reference to FIGURES 4, 5, and 6 for the transformer of FIGURES 1 to 7.

The advantage of connecting the capacitor C in parallel with the winding $P_1$ is that under the operating conditions of the transformer, the primary circuit presents an inductive reactance at the terminals $t_1$, and the voltage across the capacitor C is reduced in comparison with that obtaining in the first described embodiment, thereby enabling a reduction in cost to be attained. Further, the transformer operates with a lagging power factor.

The primary circuit again operates beyond the point of resonance and this is illustrated in FIGURE 9 wherein the curves shown which correspond to those shown in FIGURE 8 are designated by like numerals of reference. The direction of the instantaneous currents $i_1$, $i_2$ and $i_3$ are shown in FIGURE 8, whilst FIGURE 9 shows corresponding currents $I_1$, $I_2$, $I_3$ as ordinates, and voltage $V_1$ across the winding $P_1$ as abscissae.

The in-phase relation between the currents $I_1$ and $I_2$ to the right of point 5b (FIGURE 9) necessitates reversal of the winding $P_2$ relative to the winding $P_1$ in comparison with the arrangement of the transformer of FIGURES 1 to 7.

In the modification illustrated in FIGURE 10, instead of using a capacitor alone connected in parallel with one of the portions of the primary winding, the capacitor is connected in series with an auxiliary winding $P_2'$, and the series combination is connected in parallel with the appropriate portion of the primary winding, for example $P_2$, as illustrated.

The effect of this arrangement is to alter the effective value of the capacitor. For example, the series combination of capacitor C and auxiliary windings $P_2$, can be made equivalent to a capacitor of greater value, i.e., affording a lower capacitive reactance.

Preferably the winding $P_2'$ is wound in such a way as to assist the associated winding $P_2$ both these windings being disposed on the limb portion 10b.

Furthermore, since the circuit branch consisting of $P_2'$ and C in series with each other presents a capacitive reactance, the current passing through this branch tends to increase should the frequency of the supply voltage $V_p$ increase.

As the effect of $P_2$ is to decrease the secondary voltage $V_s$, an improvement in stability of secondary voltage with respect to frequency variations is produced.

A similar modification may be applied to the embodiment of the transformer illustrated in FIGURE 8. Such an arrangement is illustrated in FIGURE 11 wherein a capacitor C connected in series with an auxiliary winding $P_1'$ are together connected in parallel with the winding $P_1$.

Within the stabilizing range of voltage, the effects are generally similar to those referred to in connection with the arrangement of FIGURE 10.

Below the stabilizing range the relative direction of the currents in the windings $P_1$, $P_2$ and in C are as described for the arrangement of FIGURE 8. The winding $P_1'$ opposes $P_1$ magnetomotively since $I_3$ will be greater than $I_1$ in this range whereas $P_2$ assists $P_1$.

Saturation in the shunt branch may therefore be attained earlier than in the arrangement of FIGURE 8, i.e., for smaller values of primary voltage $V_p$.

In FIGURE 12 there is illustrated yet another modification which may be applied as shown either to the embodiment of FIGURES 1 to 7 or if desired to the embodiment of FIGURE 8.

In this modified arrangement phase-shifting windings $P_3$ and $P_3'$ are provided on the limb portions 10b and 10a respectively and are connected in series with each other and with an impedance, which may be either constant (e.g., pre-selected) or adjustable (e.g., pre-set) and which is represented by way of example as a variable resistor R.

The effect of this arrangement is to vary the phase and magnitude of the flux $\phi_2$ in the second magnetic circuit, this phase being varied by adjustment (or possible preselection of the impedance), for example, adjustment of the variable resistor R.

The two fluxes $\phi_1$ and $\phi_2$ can thus be brought into antiphase or such other approximately anti-phase relation as may be desired to produce the best compromise between stabilization and elimination of harmonics from the secondary voltage wave form $V_s$.

In the modification illustrated in FIGURE 13, the manner of operation is generally similar to that already described in connection with FIGURE 11, but an auxiliary secondary winding S' is interlinked with the second magnetic circuit. This winding S' may be connected so that the voltage induced therein is in phase or phase-opposition with that induced in the secondary winding S. In the former case the effect will be to increase the amount of power which the transformer is capable of delivering and to improve the stabilization with a possibility that the wave form may be improved. In the latter case that is when the voltage induced in the winding s' is in phase opposition to that induced in the winding S, the effect will be to improve the stabilization of the secondary voltage $V_s$ with respect to change in the frequency of the primary voltage $V_p$.

I claim:

1. A voltage stabilizing transformer comprising a core structure of magnetically conductive material including a main branch joined at its ends by a connecting branch, and including a shunt branch extending from said main branch at a position in between its ends to the connecting branch to form three magnetic circuits of which two have the shunt branch in common, the first of these two latter magnetic circuits carrying a first portion of a primary winding and a secondary winding, both on said main branch at one side of said shunt branch with at least part of said secondary winding nearer to said shunt branch than is said first portion of said primary winding, and the second of these magnetic circuits carrying a second portion of said primary winding on said main branch at the opposite side of said shunt branch, the first and second portions of said primary winding being connected electrically in a primary circuit to assist each other magnetomotively in setting up a magnetic flux through said shunt branch, and thereby establishing a magnetic saturation in said first magnetic circuit to stabilize to some extent the magnitude of the flux interlinking said secondary winding and hence the voltage induced therein, while also acting in magnetomotive opposition in the third magnetic circuit comprising said main branch and connecting branch, one of said portions of said primary winding having a capacitor connected in parallel therewith of a value such that at least a part of the primary circuit forms a circuit operating beyond the point of resonance to assist in attaining magnetic saturation in said first magnetic circuit.

2. A transformer according to claim 1 wherein the relative cross-sectional dimensions of said shunt branch, said main branch, and said connecting branch are such that said third magnetic circuit is at least less saturated than the shunt branch.

3. A transformer according to claim 1 wherein the cross-sectional dimensions of said shunt branch are such that saturation in said first magnetic circuit tends to arise initially in said shunt branch.

4. A transformer according to claim 1 wherein said capacitor is connected in parallel with the second portion of said primary winding, and the resultant impedance thereby presented is capacitive and forms a series circuit with the first portion of said primary winding operating beyond the point of resonance.

5. A transformer according to claim 1 wherein said capacitor is connected in parallel with the first portion of the primary winding with which it forms a parallel circuit operating beyond the point of resonance, said primary circuit as a whole presenting an inductive impedance.

6. A transformer according to claim 1 wherein an auxiliary winding, disposed on said main branch, is connected in series with said capacitor, the inductive reactance afforded by such auxiliary winding being less than the capacitive reactance afforded by said capacitor so that the resultant reactance of this series combination is still capacitive.

7. A transformer according to claim 6 wherein said auxiliary winding is interlinked with said second magnetic circuit and arranged to increase the voltage across said capacitor.

8. A transformer according to claim 1 wherein an auxiliary secondary winding is interlinked with said second magnetic circuit and is connected in phase with the secondary winding.

9. A transformer according to claim 1 wherein an auxiliary secondary winding is interlinked with said second magnetic circuit and is connected in phase opposition with the secondary winding.

10. A transformer according to claim 1 wherein the secondary winding is adjustable in position along the main branch of the core structure.

11. A transformer according to claim 1 wherein at least a portion of the primary winding is adjustable in position along the main branch of the core structure.

12. An electrical transformer comprising, a core structure of magnetically conductive material including a main branch, a connecting branch extending between the ends of the main branch, and a shunt branch extending from the main branch at a position intermediate its ends to the connecting branch to form first and second magnetic circuits having the shunt branch in common and respectively containing portions of the main and connecting branches on opposite sides of the shunt branch, a primary winding including a first portion disposed on that part of the main branch incorporated in the first magnetic circuit and spaced longitudinally of the main branch from the shunt branch, and a second portion disposed on that part of the main branch incorporated in the second magnetic circuit, a secondary winding disposed on the said first part of the main branch between the shunt branch and the first portion of the primary winding, and circuit means connecting the first and second portion of the primary winding electrically to assist each other and oppose each other magnetomotively in the shunt branch and the main branch respectively, the first magnetic circuit including a part so dimensioned in cross-section as to become saturated magnetically over peak portions of each half cycle of input voltage, and the first and second portions of the primary winding being formed to provide during said peak portions respective magnetomotive forces along that part of the main branch on which the secondary winding is disposed producing wave-form correction of flux interlinking the secondary winding, one of said portions of said primary winding having a capacitor connected in parallel therewith of a value such that at least a part of the primary circuit forms a circuit operating beyond the point of resonance to assist in attaining magnetic saturation in said first magnetic circuit.

13. An electrical transformer comprising, a core structure of magnetically conductive material including a main branch, a connecting branch extending between the ends of the main branch, and a shunt branch extending from the main branch at a position intermediate its ends to the connecting branch to form first and second magnetic circuits having the shunt branch in common and respectively containing portions of the main and connecting branches on opposite sides of the shunt branch, a primary winding including a first portion disposed on that part of the main branch incorporated in the first magnetic circuit and spaced longitudinally of the main branch from the shunt branch, and a second portion disposed on that part of the main branch incorporated in the second magnetic circuit, a secondary winding disposed on the first said part of the main branch between the shunt branch and the first portion of the primary winding, and circuit means connecting the first and second portion of the primary winding electrically to assist each other and oppose each other magnetomotively in the shunt branch and the main branch respectively, the shunt branch having a minimum cross-sectional area such as to saturate magnetically during peak portions of each half cycle of input voltage, said core structure affording flux leakage paths extending laterally from the main branch to the shunt branch in the region of the secondary winding, and the first and second portions of the primary winding being disposed in opposed-pole end-to-end magnetomotive relation at opposite ends of this region to control by their relative magnetomotive forces the extent of flux diversion along said leakage paths during said peak portions of each half cycle input voltage, one of said portions of said primary winding having a capacitor connected in parallel therewith of a value such that at least a part of the primary circuit forms a circuit operating beyond the point of resonance to assist in attaining magnetic saturation in said first magnetic circuit.

References Cited in the file of this patent

UNITED STATES PATENTS

| | | |
|---|---|---|
| 2,760,145 | Dunn | Aug. 21, 1956 |
| 2,875,378 | Walsh | Feb. 24, 1959 |

FOREIGN PATENTS

| | | |
|---|---|---|
| 549,655 | Great Britain | Dec. 1, 1942 |